(12) United States Patent
Oishi

(10) Patent No.: US 8,543,825 B2
(45) Date of Patent: Sep. 24, 2013

(54) METHOD AND APPARATUS FOR INPUT OF CODED IMAGE DATA

(75) Inventor: Kazuomi Oishi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/445,012

(22) Filed: Apr. 12, 2012

(65) Prior Publication Data

US 2012/0198239 A1 Aug. 2, 2012

Related U.S. Application Data

(62) Division of application No. 12/572,357, filed on Oct. 2, 2009, now Pat. No. 8,181,026, which is a division of application No. 11/211,426, filed on Aug. 26, 2005, now Pat. No. 7,603,561, which is a division of application No. 08/777,246, filed on Dec. 31, 1996, now Pat. No. 7,000,112.

(30) Foreign Application Priority Data

Jan. 12, 1996 (JP) .................................. 8-003603

(51) Int. Cl.
*H04L 9/00* (2006.01)
*H04L 9/32* (2006.01)

(52) U.S. Cl.
USPC ............ 713/176; 713/189; 713/192; 713/193

(58) Field of Classification Search
USPC ................. 713/176, 189, 192–194; 380/217, 380/277, 44; 382/100; 726/26–27, 30
See application file for complete search history.

(56) References Cited

U.S. PATENT DOCUMENTS

| | | | |
|---|---|---|---|
| 4,656,474 A | 4/1987 | Mollier et al. | |
| 4,799,258 A | 1/1989 | Davies | |
| 4,908,861 A | 3/1990 | Brachtl et al. | |
| 5,022,080 A | 6/1991 | Durst et al. | |
| 5,042,073 A | 8/1991 | Collot et al. | |
| 5,157,726 A | 10/1992 | Merkle et al. | |
| 5,499,294 A | 3/1996 | Friedman | |
| 5,801,856 A | 9/1998 | Moghadam et al. | |
| 5,844,961 A | 12/1998 | McEvoy et al. | |
| 5,875,249 A * | 2/1999 | Mintzer et al. | 380/54 |
| 6,064,764 A * | 5/2000 | Bhaskaran et al. | 382/183 |
| 7,000,112 B1 | 2/2006 | Oishi | |
| 7,603,561 B2 * | 10/2009 | Oishi | 713/176 |
| 8,181,026 B2 * | 5/2012 | Oishi | 713/176 |

OTHER PUBLICATIONS

Ivan Bjerre Damgård, "Practical and Provably Secure Release of a Secret and Exchange of Signatures", Proceedings of Advances in Cryptology—EUROCRYPT '93, 1994, pp. 200-217.
David Chaum et al., "Group Signatures", Advances in Cryptology—EUROCRYPT '91 Workshop on the Theory and Application of Cryptographic Techniques Proceedings, 1991, pp. 257-265.
Amos Fiat et al., "How to Prove Yourself: Practical Solutions to Identification and Signature Problems", Advances in Cryptology—CRYPTO '86 Proceedings, 1987, pp. 186-194.

(Continued)

*Primary Examiner* — Hosuk Song
(74) *Attorney, Agent, or Firm* — Fitzpatrick, Cella, Harper & Scinto

(57) ABSTRACT

An image input device which includes a means for inputting image data, a memory for storing secret information and an operator for carrying out an operation by using the image data and the secret information.

30 Claims, 4 Drawing Sheets

(56) References Cited

OTHER PUBLICATIONS

Eiji Okamoto, ID-Based Key Distribution System, , C&C Information Technology Res. Labs., NEC Corporation, 1986, p. 15.
R.L. Rivest et al., "A Method of Obtaining Digital Signatures and Public-Key Cryptosystem", Comm. of ACM 1987, pp. 120-126.
H.C. Williams, "A Modification of the RSA Public-Key Enryption Procedure", IEEE Trans. Inf. Theory, IT-26, 6, 1980, pp. 726-729.
A. Shamir et al., "On the Security of the Merkle-Hellman Cryptographic Scheme" IEEE Trans. Inf. Theory, IT-26, 3, 1980, pp. 339-340.
S. Goldwasser et al., "Strong Signature Schemes", ACM Symp. on Theory of Computing 1983, pp. 431-439.
H. Ong, et al., "An Efficient Signature Scheme Based on Quadratic Equations", ACM Symp. on Theory of Computing, 1984, pp. 208-216.
S. Goldwasser et al., "A Paradoxdical Solution to the Signature Problem", ACM Symp. on Foundation of Computer Science, 1984.

* cited by examiner

METHOD AND APPARATUS FOR INPUT OF CODED IMAGE DATA

RELATED APPLICATIONS

This is a divisional of application Ser. No. 12/572,357, filed Oct. 2, 2009, which is a divisional of application Ser. No. 11/211,426, filed Aug. 26, 2005, and now U.S. Pat. No. 7,603,561, which is a divisional of application Ser. No. 08/777,246, filed Dec. 31, 1996, and now U.S. Pat. No. 7,000,112. It claims benefit of all three applications under 35 U.S.C. §120, and claims benefit under 35 U.S.C. §119 of Japanese Patent Application No. 003603/1996, filed Jan. 12, 1996; the entire disclosure of each of the four mentioned prior applications is hereby incorporated by reference.

BACKGROUND OF THE INVENTION

1. Field of the Invention

This invention relates to an image input apparatus and to a method for preventing forgery of image data.

2. Related Background Art

Image input systems which convert an image to digital image data should be capable of providing high definition image at low cost. Accordingly, there has been developed image input apparatus which is capable of producing a high definition image with highly efficient coding.

Prior input apparatus which processed analog image signals were not subject to easy forgery. However, recently developed digital image input systems which process images in digital form have been subject to easy forgery. As a result, the credibility of the output image data is weakened.

SUMMARY OF THE INVENTION

This invention is directed to overcoming the above described problem. It is an object of the invention to provide an image input apparatus and method which can 30 ensure the integrity of digital image data. This method and apparatus makes use of digital signature technology.

According to a publication of Eizi Okamoto of Kyouritu Syuppan, Inc., a digital signature assures that the person who purports to generate a message or information is the true author of the message. This digital signature may be used by the recipient of the message as assurance that the information contained therein is true.

According to the invention, an image input apparatus generates a particular digital signature in relation to image data; and outputs this digital signature together with the digital image data.

In an image receiving system, an entity which receives the digital image data and the digital signature will be able to ascertain the authenticity of the image data by checking the relation between the image data and the digital signature. And, if the relation between the image data and the digital signature is inappropriate, the receiving entity will judge that the image data has been falsified or altered. Thus, the image input apparatus and the image receiving system guarantee the authenticity of the image data and its credibility as evidence.

DETAILED DESCRIPTION OF THE PREFERRED EMBODIMENTS

The First Embodiment

Figure 1:
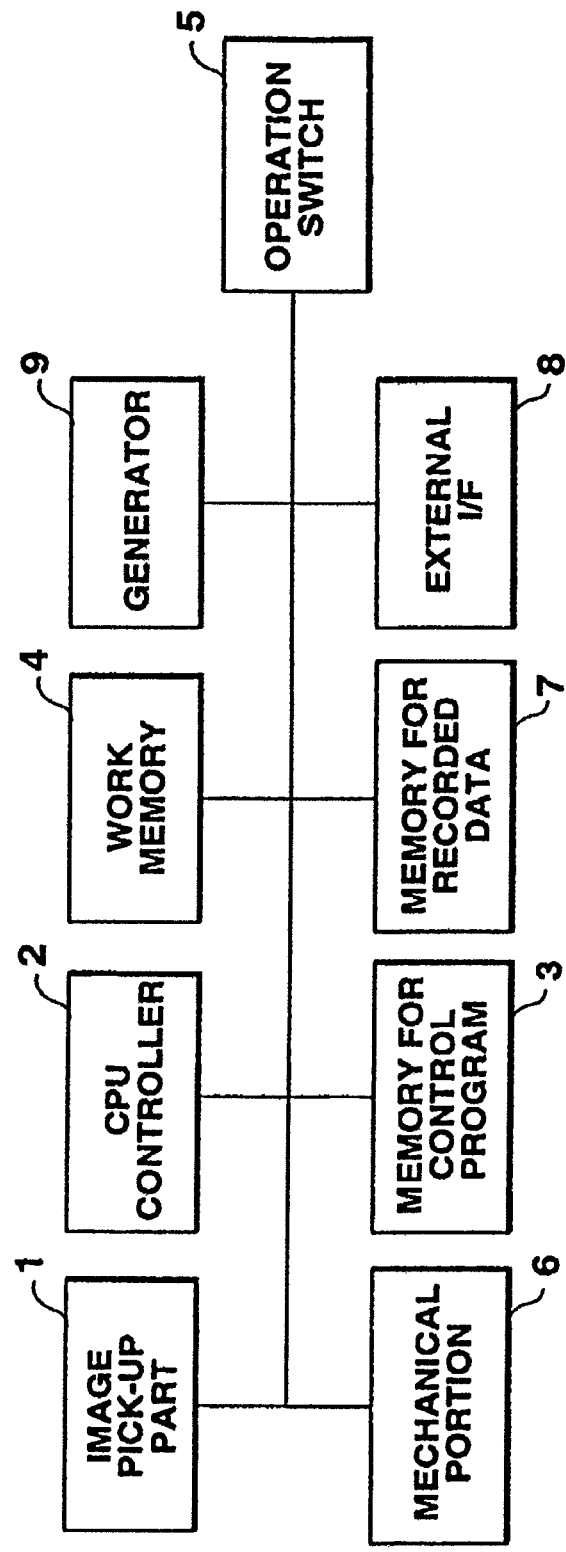
FIG. 1 is a block diagram showing an embodiment of the invention.

In the first embodiment of the invention, a public key cryptography is applied to an image input apparatus as an algorithm of a digital signature. The apparatus uses a secret key corresponding to the public key as its own secret information.

It should be understood that this embodiment is only one example. Another embodiment may be realized by using another algorithm instead of the public key cryptography, provided that the other algorithm is able to verify original information which is being based upon the original information and the secret information.

First, a public key cryptography will be described. Then an image unit will be described as well as a detailed process for a digital signature. Finally, the process for verifying the digital signature will be described.

(Public-Key Encryption System)

Public-key cryptography is one type of cryptography. Public-key cryptography uses two different keys, namely, an encryption key and a decryption key. In public key cryptography, the encryption key is published, but the decryption key is not published.

Public-key cryptography provides a certification function which assures to the receiver that transformed information has not been changed and that the sender is not a pretender. Generally, public-key cryptography has been considered as one of the most effective methods for protecting data.

The operation for encrypting an original message (M) by using a public key (PK) is: E (PK, M). The operation for decrypting the encrypted message (M) by using a secret key (SK) must satisfy the following two conditions:

(1) The operation for encryption E(PK, M) must be easily carried out using the public key PK and the operation for decryption D(SK, M) must be easily carried out using the secret key SK by a person who knows the secret key SK; and (2) Even if the user has both the public key PK and the process or operation for encrypting E (PK, M), it must be nearly impossible to obtain the original message M without the secret key SK in view of the extremely large number of operations that would have to be carried out for determining the original message M.

A secret communication will be able to be realized by satisfying the above conditions (1) and (2) and the following condition (3):

(3) The operation for encrypting all original message M with the public key PK must be possible; and the operation for decryption D(SK, E(PK, M)) must produce a recognizable message (M);

i.e. $D(SK, E(PK, M)) = M$.

This means that anyone will be able to encrypt the message (M) by using the public key PK; but only a person who knows the secret key SK will be able to decrypt the encrypted message.

On the other hand, certification will be realized by satisfying conditions (1) and (2) and the following condition (4):

(4) The operation for decrypting a message (M) with the secret key SK is possible; and the operation for encrypting E (PK, D (SK, M).)=M must be possible.

This means that only a person who knows the secret key SK will be able to decrypt the message (M) by using the secret key SK. So, if someone who has a different secret key SK, and pretends to be a person who knows the secret key SK, tries to decrypt the message (M) by using that secret key SK, he will not be able to obtain the message (M);

i.e. $E(PK,D(SK',M)) \neq M$.

The receiver will therefore find out the forgery carried out by some third party.

On the other hand, if D(SK, M) is altered by someone, for example, to D(KS, M)', he will not be able to obtain the message (M);

i.e. $E(PK,D(SK,M)') \neq M$.

Therefore, in this case also, the receiver will find out the modification carried out by the illicit act of a third party.

The result of the operation for decrypting D(SK, M) is referred to as: "A Digital Signature for Text M".

The typical public key cryptography is as follows.

Cryptography which can realize both secret communications and authenticated communications is known as:

"RSA cryptography"—(R. L. Rivest, A. Shamir and L. Adleman: "A Method of Obtaining Digital Signatures and Public-key Cryptosystems", Comm. of ACM 1987);

"R cryptography"—(M. Rabin: "Digitalized Signatures and Public-key Cryptosystems", MIT/LCSTR¬35 212, Technical Report MIT. 19797);

"W cryptography"—(H. C. Williams: "A Modification of the RSA Public-key Encryption Procedure", IEEE Trans. Inf. Theory, IT-26, 6, 1980); and "MI cryptography"—(T. Matsumoto and H. Imai: "A Class of Asymmetric Cryptosystems Based on Polynomials Over Finite Rings", IEEE International Symp. on Information Theory, 1983), etc.

Cryptography which can realize secret but authenticated communications is known as:

"MH cryptography"—(R. C. Merkle and M. E. Hellman: "Hiding Information and Signatures in Trapdoor Knapsacks", IEEE Trans. Inf. Theory, IT-24, 5, 1987; "GS cryptography"—(A. Shamir and R. E. Zippel: "On the Security of the Merkle-Hellman Cryptographic Scheme", IEEE Transs. Inf. Theory, IT726, 3, 1980);

"CR cryptography"—(B. Chor and R. L. Rivest: "A Knapsack Type Public-key Cryptosystem Based on Arithmetic Infinite Field", Proc. Crypto 84);

"M cryptography"—(R. J. McElice: "A Public-key Cryptosystem Based on Algebraic Coding Theory", DSN Progress Rpt., Jet Propulsion Lab., 1978);

"E cryptography"—(T. E. El Gamel: "A Public-key cryptocsystem and Signature Scheme Based on Discrete Logarithms", Proc. Crypto84, 1984));

"T cryptography"—(Sigeo Tsuzii: "A Public-key System Based on Matrix Analysis" [Japanese], IT85-12, 1985, etc.

Cryptography which is able to realize authenticated communications but secret communications is known as:

"S cryptography"—(A. Shamir: "A FastSignature Scheme", Report MIT/LCS/TM-107, MIT Laboratory for Computer Science, Cambridge, Mass., 1978);

"L cryptography"—(K. Liberherr: "Uniform Complexity and Digital Signature", Lecture Note in Computer Science 115 Automata, Language and Programming, Eighth Colloquium Acre, Israel, 1981):

"GMY cryptography"—(S. Goldwasser, S. Micali and A. Yano: "Strong Signature Schemes", ACM Symp. on Theory of Computing, 1983);

"GMR cryptography"—(S. Goldwasser, S. Micali and R. L. Rivest: "A Paradoxical Solution to the Signature Problem", ACM Symp. on Foundation of Computer Science, 1984);

"OSS cryptography"—(H. Ong, C. P. Schnorr and A. Shamir: "An Efficient Signature Scheme Based on Quadratic Equations", ACM Symp. on Theory of Computing 1984);

"OS cryptography"—(T. Okamoto and A. Shiraisi: "A Fast Signature Scheme Based on Quadratic Inequalities", IEEESymp. on Theory of Computing, 1984), 15 etc.

(Construction of the Image Input Device)

An embodiment of the invention to which digital signature based on the public-key cryptography is applied will be described herein below with reference to FIG. 1. In FIG. 1, an image input device, such as a digital camera, is shown by functional blocks. A line which connects the blocks represents a control and data bus.

The image input device includes an image pick up part 1 which converts an optical image into an electrical signal. The image pick-up part 1 includes a signal processor, an analog-to-digital converter, an image processor and a coder. The electrical signal is processed in the processor, converter and coder and is output as a digital signal.

The image input device also includes: a controller 2 (CPU) for controlling the image input device by performing predetermined operations based on control software stored in a memory; a memory 3 for storing the control software; a work memory 4 for use during operation of the apparatus; an operation switch 5 for inputting commands and designating an area of an image for the digital signature of a user; a mechanical portion. 6 for controlling mechanical operations of the image input device based on commands from the controller 2; and a main memory 7 for storing the processed image output. The mechanical portion 6, for example, includes motor and an optical system, composed of a lens and a shutter. In addition, the image input device also includes: an 'external interface 8 for connecting the input device with other external devices, for example a personal computer, a memory device, etc., for transferring image data or control software to such external devices; and a generator 9 for generating a digital signature for the inputted image data based upon a predetermined algorithm.

The above described image input device operates to obtain image data in the following manner. A user initiates an input command by operating the operation switch 5. This causes the controller 2 to respond to the command and control software to control the image portion 1 and the mechanical portion 6. Thereafter, image data is supplied to the generator 9; and the generator 9 produces a digital signature which corresponds to an area-of the image represented by the image data. The image data and digital signature are recorded and/or sent to the external device via the interface 8, according to a command.

Alternatively, the image data is first stored in the memory 3; and thereafter only a part of the image data, 35 which corresponds to one area of the image recorded in the memory, is read out and is fed to the generator 9.

The generator 9 generates the digital signature based on this image data for this area.

One embodiment, which is used as a camera for producing digital images and can produce a digital signature based on a public-key cryptography, has a secret key SKcam. In this embodiment, the secret key SKcam, and an algorithm for generating the digital signature Dcam, are stored in the generator 9. In addition, a public key PKcam and an algorithm for verifying an Ecam are known by the entity who wishes to check the integrity of the information. The procedure for generating the digital signature is described below.
(Digital Signature Generation)

Image data (I) is generated by the image pick-up part 1 and is fed to the generator 9. The generator 9 carries out an operation by using the secret key (SKcam) and an algorithm for generating a digital signature; and outputs the digital signature (Dcam (SKcam, I)). The image data (I) and the digital signature (Dcam (SKcam, I)) are recorded in the memory 7 and/or are output to an external device via the interface 8.

The detailed procedure for verifying that the image data −(I) and the digital signature corresponding to the image data (I) are actually generated by the same image input device is described below. In this embodiment, an image input system consists of the image input device and verifying means.
(Digital Signature Verification)

The image data (I') and the digital signature (D'cam (SKcam, I)) are verified by carrying out the following operation using a public key (PKcam) and the algorithm for verifying the digital data (Ecam);

i.e. $I'=Ecam(PKcam, D'cam(SKcam, I))$.

If the above equation produces a recognizable image, the image data (I') is the image data (I) which was input from the image pick-up part. On the other hand, if the above equation does not produce a recognizable image, the image data (I') is not the image data (I). Accordingly, the verifier can determine whether the image data (I') was modified or forged.

According to this embodiment, the digital signature is generated based on the same area of the image designated by the user. Therefore, the time for generating the digital signature can be shortened; and the load requirements of the system can be reduced.

The Second Embodiment

The second embodiment, which uses a public key cryptography as an algorithm for digital signature and a secret key which is stored in the external device, is described herein in reference to FIG. 1. In this embodiment, the external device which stores the secret keys of registered users (SKinan) (corresponding to each registered user's public key (PKman)) and an algorithm for generating a digital signature (Dman) (corresponding to an algorithm for verifying the digital signature), is a portable device. This device is a data processing device; and it is connected to the image input device via the interface 8. On the other hand, the public key (PKman), and the algorithm for verifying the digital signature, are known by the entity who also wishes to check the integrity of the input image data.

The basic operation for inputting image data is described as follows. When inputting (for example, V⁻ photographing), information, the external device is connected to the input device via the interface 8. The user inputs a command for photographing by operating the switch 5 and a command for generating the digital signature by inputting his own user's number (which is similar to an identification number). The controller then ascertains the user's number and controls the image pick-up part 1 and the mechanical part 6 based on the control software stored in the memory 3. The image data is then fed to the generator 9. If the user's number is correct, i.e. if it coincides with one of the registered numbers, the controller 2 communicates with the external device via the interface 8 and gets the secret key (SKman) of the user and the algorithm for generating the user's digital signature. The controller 2 then carries out an operation using the user's secret key (SKman) and the algorithm to generate the user's digital signature. The digital signature and the image data are recorded and/or output to the external device according to command. In the above described embodiment, the detailed procedure for generating the digital signature is as follows:
(Digital Signature Generation)

The controller 2 ascertains the user's number and downloads the secret key (SKman) and the algorithm for generating the digital signature from the external device, via the interface 8; and enters them into the memory 4. The image data generated by the image pick¬up part 1 is fed to the generator 9. The generator 9 carries out an operation by using the secret key (SKman) and the algorithm for generating a digital signature; and it outputs the digital signature (Dman (SKman, I)). The image data (I) and the digital signature (Dman (SKman, I)) are recorded in the memory 7 and/or are output to the external device via the interface 8.

The detailed procedure for verifying that the image data (I) and the corresponding digital signature have actually been generated by the above input image device when the external device is connected with the input image device, is as follows:
(Digital Signature Verification)

Image data (I)' to be examined and the digital signature (D'man (SKman, I)) to be examined are verified by carrying out an operation which uses a public key (PKman) for verifying the digital data (Ecam).

i.e. $I'=Eman(PKmanDman(SKman, I))$.

If the equation produces a recognizable image, the image data (I') is the image data that was input by the image input device. On the other hand, if the equation does not produce a recognizable image, the image data I' is known to be not the true image data (I); and that the examined image data (I') has been modified by a different person at a different place. Consequently, the user can determine that the examined image data (I') is modified or forged data. Accordingly, an image input system which guarantees that the image has been input by the external device is realized in this embodiment.

In this embodiment, the users' numbers are changed or another user's number is additionally registered by a person who is authorized to change or add to the user numbers. Therefore, impersonation can be absolutely prevented.

Third Embodiment

The third embodiment, which uses a public key cryptography as the algorithm for a digital signature, and in which a secret key is stored in an external device which can operate on the data, is described hereinbelow, also with reference to FIG. 1.
(Digital Signature Generation)

The controller 2 transfers the image data, which was generated by the image pick-up part 1, to the external device via the interface 8. The generator 9 in the external device caries out an operation by using the user's secret key (SKman) and the image data based on the algorithm for generating a digital signature. The external device then outputs the digital signature (Dman (SKman, I)) and the image data and transfers them to the image input device via the interface 8. In the image input device, the transferred image data (I) and the digital signature (Dman (SKman, I)) are recorded in the memory 7 and/or outputted to the external device via the interface 8.

The detailed procedure for verifying that the image data (I) and the digital signature corresponding to the image data (I) have actually been generated by the above image input device when the external device is connected with the image input device, will now be described.

(Digital Signature Verification)

Verification in the third embodiment is the same as in the second embodiment.

The Fourth Embodiment

The fourth embodiment, which uses a public key cryptography as an algorithm for digital signature. In this embodiment, respective secret keys are stored in both the external device and in the image input device, will now be described, again with reference to FIG. 1.

(Digital Signal Generation)

The controller 2 downloads the secret key (SKman) and the algorithm for generating the digital signature (Dman) into the memory 4 and into the controller 2, from the external device via the interface 8. The image data (I) which was generated by the image pick-up part 1 is fed into the generator 9 in the image input device. The generator 9 caries out an operation by using the secret key SKman and the digital signature (Dman (SKman, I)) based on the algorithm for generating the digital signature (Dman); and outputs the digital signature of the camera Dcam(SKcam, Dman(SKman, I)). The image data (I) and the digital signature of the camera Dcam(SKcam, Dman (SKman, I)) are recorded in the memory 7 and/or outputted to an external device via the interface 8.

The detailed procedure for verifying that the image data (I) and the digital signature corresponding to theimage data (I) have actually been generated by the particular external device when that external device is connected with the image input device, will now be described.

(Digital Signature Verification)

The received image data (I') and the received digital signature D'cam (SKcam, Dman (SKman, I)) are verified by carrying out the following operation using the public key PKcam and the algorithm for verifying the digital data Ecam, the algorithm for verifying the digital data Eman and the public key PKman; i.e.

$$I'=Eman(PKman,Ecam(PKcam,D'cam(SKcam,Dman(SKman,I)).$$

If the operation produces a recognizable signature, this shows that the examined image data (I') is the true image data (I) which was input from the image input device. On the other hand, if the operation is not good, the examined image data (I') is seen to be not the true image data (I); and that it has been modified by another person or at another location. The user can thus determine that the examined image data (I)' has been modified or forged. Therefore, this embodiment provides an image input system which guarantees that the correct image is input from the external device. It will be seen that the reverse order of generating the digital signature, by the image input device and the external device and verifying the digital signature, will provide the same result. Also, the algorithm for generating the digital signature in the external device may be stored in the image input device.

The Fifth Embodiment

In this embodiment, the image input device generates the digital signature by using compressed image data. The compressed data transform is represented herein as "C"; and the entity who wishes to verify that the image data is correct knows the compressed data transform "C". The image input device in this embodiment is the same as in the above described embodiments.

(Digital Signature Generation)

The controller 2 carries out its operation using compressed image data for generating the digital signature rather than the image data which is input by the image input part 1. The other procedures involved in the generation of the digital image signature are the same as in the above embodiments. For example, the image data and the digital signature D'cam (SKcam, c(I)) is verified by using the algorithm for verifying the, digital signature Ecam and the pubic key PKcam; i.e. the verification conforms to the following equation:

$$C(I')=.Ecam(PKcam,D'cam(SKcam,C(I)).$$

If the above equation holds, the examined image data (I') is seen to be the image data that had been input by the image input device. On the other hand, if the equation does not hold, the examined image data (I') is seen to be different from the original image data (I). In this manner the verifier can confirm that the image data (I') is modified or forged information.

The Sixth Embodiment

In this embodiment, the image input device is a digital camera; and a public key algorithm is used as the cryptography for generating and verifying the digital signature. In addition, both the digital camera and the external device have their own secret key for use with the public key encrypted information. This embodiment is described herein below with reference to FIG. 2.

(The Construction of the Digital Camera)

Figure 2:
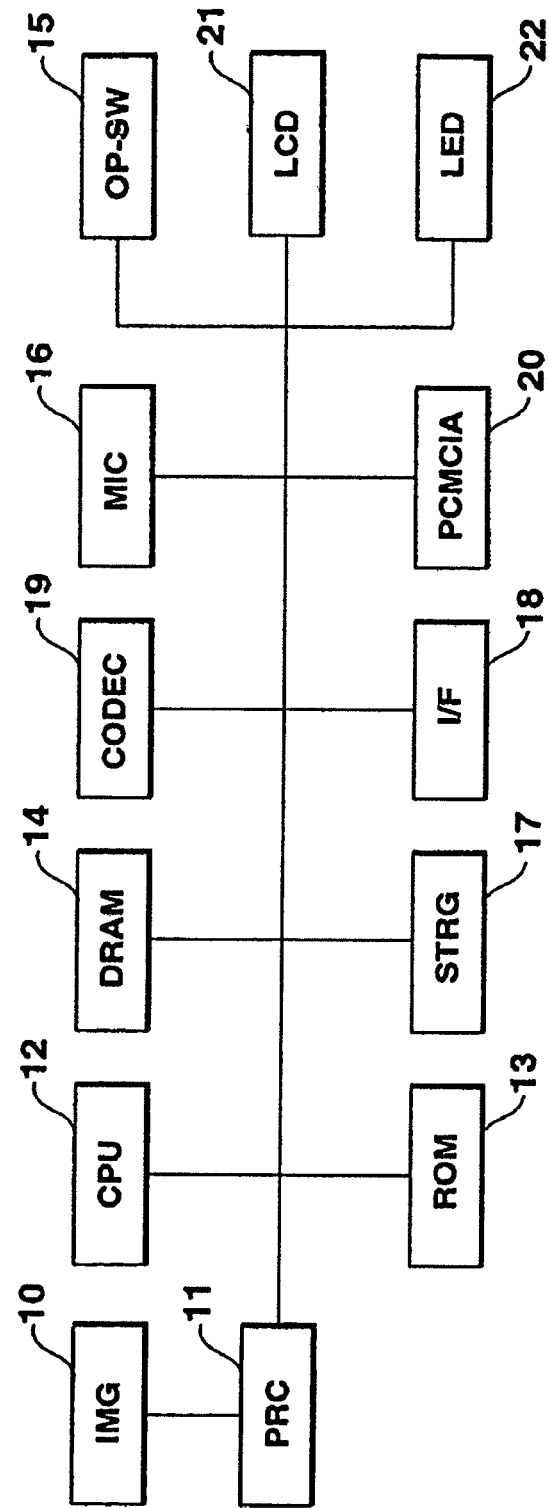
FIG. 2 is a block diagram for a digital camera which serves as an image input apparatus.

In FIG. 2, each block represents a functional portion of the digital camera; and each line which connects the blocks represents a control or data bus. The digital camera has an image input portion 10 (IMG) which converts an optical image into an electrical signal, a signal processor 11 (PRC) which includes an analog-to-digital converter, and an image processor, a coder and a converter which processes the electrical signal and outputs a digital signal. The digital camera also includes: a controller 12 (CPU) for performing predetermined operations based on a control program; a memory 13 (ROM) for storing the control program; a work memory (i.e. a DRAM) 14 which is used as a work area; an operation switch 15 (OP-SW) for inputting commands by the user; a microphone 16 (MIC) for the input of audio information; a main memory 17 (STRG) for storing the output (i.e. image and audio data and/or information regarding a situation or condition for photographing) of the image input portion 10 and/or the microphone 16, etc.

In addition, the digital camera has: an external interface 18 (I/F) for connecting the camera with an external device (for example, a personal computer, a memory device, etc.) and for communicating the image data and/or control software with the other external device; a generator 19 (CODEC) for generating a digital signature for the image data and/or audio data based on a predetermined algorithm; an interface 20 for a PCMCIA card based on PCMCIA standards. Also, the digital camera has a liquid crystal display (LCD) display 21 and a light emitting diode (LED) type lamp 22.

The basic operation for generating image data with this digital camera will now be described. The external device is connected with the interface 18; and the user inputs commands by operation of the switch 15. The controller 12 communicates with the external device, and the controller 12 controls the image input portion 10 and processes a compressed image data, etc. by using the secret key, the algorithm for generating the digital signature stored in the external device and the secret key, and the algorithm for generating the digital signature stored in the digital camera.

The image data and the digital signature are recorded and/or sent to the external device via the interface 18 or the PCMCIA interface 20, based on command. Alternatively, the image data is first stored in the memory 3, and thereafter the data is read out from the memory 3 and fed into the generator 9. The generator 9 generates the digital signature based on this data.

An embodiment comprising a camera as above described may be used for the generation of a digital signature based on public-key cryptography. The camera described in this embodiment has a secret key. The secret key of the camera is expressed as SKcam. The algorithm of the camera for generating the digital signature is expressed as Dcam; the algorithm for verifying the digital signature is expressed as Ecam; the public key is expressed as PKcam; and the algorithm for data compression is expressed as H. Also in this embodiment, the secret key stored in the external device is expressed as SKman; the algorithm for generating the digital signature is expressed as Dman; the algorithm for verifying the digital signal is expressed as Eman; and the public key is expressed as PKman.

Further, in this embodiment, the algorithm for verifying the digital signature Ecam and the public key PKcam of the digital camera, the algorithm for verifying the digital signature Eman and the public key PKman of the external device and an algorithm for compressing the data H, are known by the entity who wishes to verify to correctness of the data.

The procedure for generating the digital signature will be described hereinbelow.

(Digital Signature Generation)

The image data (I) generated by the image input part 11 is fed to the generator 19. The generator 19 caries out an operation by using the secret key SKcam and the algorithm for generating the digital signature Dcam; and outputs the digital signature Dcam (SKcam, H(I)) to the external device via the interface 18. The external device caries out an operation by using the secret key SKman and the algorithm for generating the digital signature Dman and the digital signature Dcam (SKcam, h(I)) and returns the digital signature Dman (SKman, Dcam(SKcam, h(I))) to the digital camera via the interface 18. The image data (I) and the digital signature Dman (SKman, Dcam(SKcam, h(I) are recorded in the memory 17 and/or are output to the external device via the interface 18.

The detailed procedure for verifying that the image data (I) and the digital signature corresponding to the image data (I) were actually generated by the above image input device is as follows.

(Digital Signature Verification)

The image data (I) and the digital signature Dcam(SKman, Dcam(SKcam, H(I)) are verified by carrying out an operation which uses the public key PKman, the algorithm for verifying the digital data Eman of the external device, the public key PKcam, the algorithm for verifying the digital data Ecam, and the compression algorithm H of the digital camera.

For example, $$H(I')=Ecam(PKcam,D'man(SKman,Dcam(SKcam,H(I'))))$$

If the equation holds, the image data (I') is the true image daa that had been input by the digital camera.

On the other hand, if this equation does not hold, the image data (I') will be understood not to be the true image data (I). Accordingly, the verifier can determine that the image data has been modified or forged.

Another Embodiment

This invention includes all image input devices and systems obtained by combining each of the above described embodiments.

Figure 3:
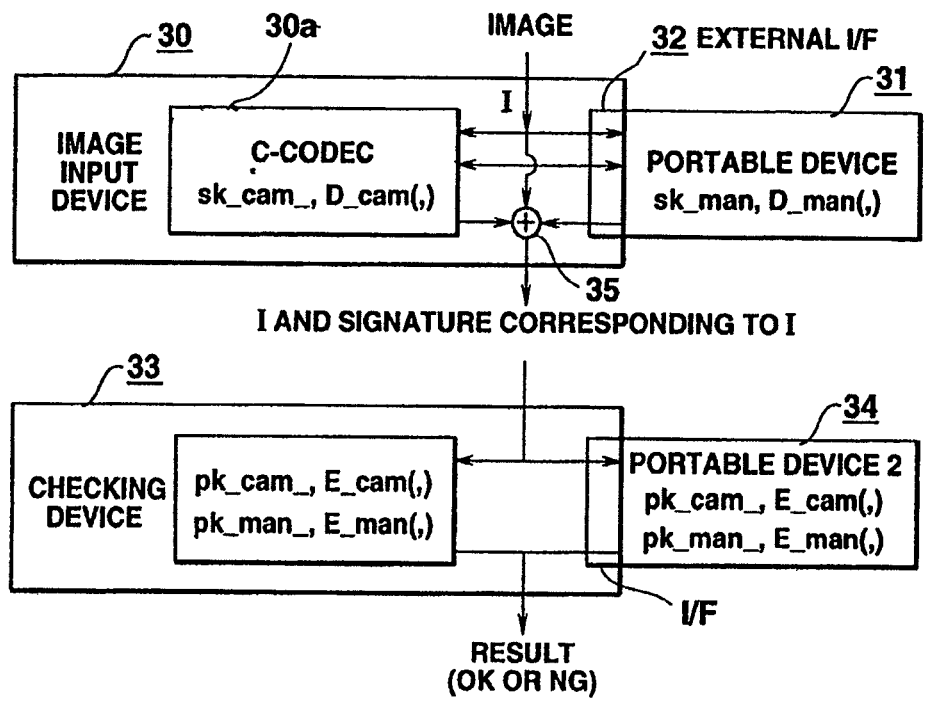
FIG. 3 is a block diagram showing an embodiment of an image input system.

FIG. 3 shows, in conceptual form, the construction of the image input system with a verification function. In FIG. 3, an image input device 30, similar to the image input devices of the above embodiments, is connected with a portable external device 31 via an external interface 32. Also, a checking device 33 is connected with another external device 34 to verify the digital signature.

For example, the checking device may be a personal computer which has an algorithm for verifying the digital signature Ecam, the public key PKcam of the image input device, the algorithm for verifying the digital signature Eman, and the public key PKman of the external device. Alternatively, the checking device may be a personal computer connected to the external device; and the external device may have an algorithm for verifying the digital signature Ecam, the public key PKcam of the image input device, the algorithm for verifying the digital signature Eman, and the public key PKman of the external device.

The term "image" in FIG. 3 refers to an object being photographed; and "(I)" refers to image data. An image input device which is connected with the external device 34 via the interface serves as the checking device. The image data is fed selectively into the generator (C-CODEC) 30a and into the external device 32 via the interface; and/or is output from the generator 30a to the interface 32.

As shown in FIG. 3, an adder or mixer 35 is provided for adding or mixing the output from the generator 30a or the external device 31 to or and the image data (I).

Figure 4:
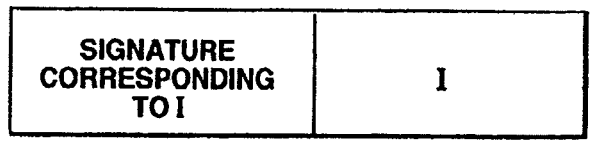
FIG. 4 is a data format outputted by the image input system.

The output of the adder 35 is illustrated in FIG. 4. The image data and the digital signature corresponding to the image data (I) are packaged in a predetermined unit as shown in FIG. 4.

It will be appreciated that if the image input system uses the RSA cryptosystem, the input system output will be only the digital signature. This is because the image data can be recovered from the digital signature in the RSA cryptosystem. Accordingly, even if the input system does not have the CODEC system for data compression, the system can record and/or communicate only the digital signature without reducing the memory capacity and the communication efficiency.

Figure 5:
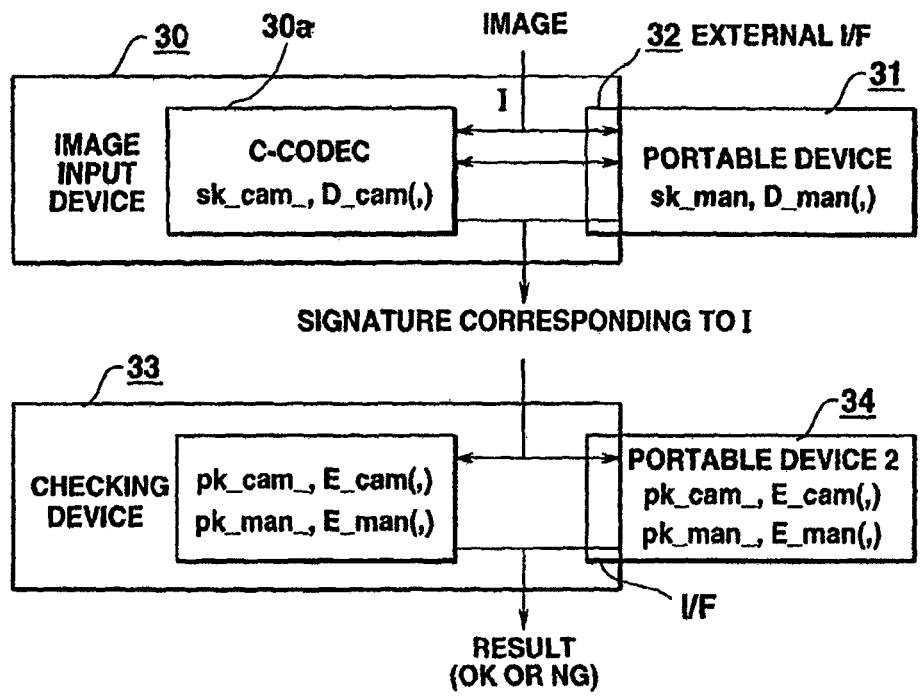
FIG. 5 is a block diagram of an image input system which outputs a digital signature.
Figure 6:
FIG. 6 is a data format outputted by the image input system.

The system and the form of its output are shown in FIGS. 5 and 6, respectively. The image input device of this invention need not be only a digital camera. It may, for example, be a scanner, a copying machine, a facsimile, a filing system, an optical character recognition (OCR) system, etc. Also, this invention is not limited to image data but it may be used for the processing of several other kinds of information.

According to the above described embodiments, the operator cannot generate the digital signature without the image input device or the external device which has the secret key and the algorithm for generating the digital signature. Accordingly anyone can easily verify the correctness of the signature by using the public key and the algorithm for verifying the digital signature corresponding to the secret key and the algorithm for generating the digital signature, respectively.

Thus, according to the above described embodiment, the image input device or the image input method can guarantee that the image data had been generated by the image input device or system without modification or forgery; and it can guarantee the authenticity of the digital information as well as the image data, the audio data, etc., as evidence. Thus, this embodiment can be used to protect from the malicious use of digital information.

What is claimed is:

1. An image input apparatus comprising:
    an image data generating unit that generates image data;
    an interface unit that (a) transmits the image data to an external device and receives verification information from the external device,
        wherein the external device receives image data from the image input apparatus, converts the image data received from the image input apparatus into compressed image data, generates, using a secret key included in the external device and the compressed image data, the verification information, and transmits the verification information to the image input apparatus, and
    wherein the verification information is used to verify whether the image data is altered or not; and
    a memory that stores the image data and the verification information.

2. The image input apparatus according to claim 1, wherein the verification information corresponds to a digital signature.

3. The image input apparatus according to claim 1, wherein the secret key included in the external device corresponds to a secret key used in public key cryptography.

4. The image input apparatus according to claim 1, wherein the image input apparatus includes a digital camera.

5. The image input apparatus according to claim 1, wherein the image input apparatus includes one of a scanner, a copying machine, and a facsimile.

6. The image input apparatus according to claim 1, wherein the interface unit transmits the image data and the verification information to the external device.

7. A method comprising:
    transmitting, to an external device, image data generated in an image input apparatus;
    receiving verification information from the external device,
        wherein the external device receives image data from the image input apparatus, converts the image data received from the image input apparatus into compressed image data, generates, using a secret key included in the external device and the compressed image data, the verification information, and transmits the verification information to the image input apparatus, and
        wherein the verification information is used to verify whether the image data is altered or not; and
    storing the image data and the verification information in a memory included in the input apparatus.

8. The method according to claim 7, wherein the verification information corresponds to a digital signature.

9. The method according to claim 7, wherein the secret key included in the external device corresponds to a secret key used in public key cryptography.

10. The method according to claim 7, wherein the image input apparatus includes a digital camera.

11. The method according to claim 7, wherein the image input apparatus includes one of a scanner, a copying machine, and a facsimile.

12. The method according to claim 7, further comprising transmitting the image data and the verification information to the external device.

13. An image input apparatus comprising:
    an image data generating means for generating image data;
    an interface means for transmitting the image data to an external device and receiving verification information from the external device,
        wherein the external device receives image data from the image input apparatus, converts the image data received from the image input apparatus into compressed image data, generates, using a secret key included in the external device and the compressed image data, the verification information, and transmits the verification information to the image input apparatus, and
        wherein the verification information is used to verify whether the image data is altered or not; and
    a storing means for storing the image data and the verification information.

14. The image input apparatus according to claim 13, wherein the verification information corresponds to a digital signature.

15. The image input apparatus according to claim 13, wherein the secret key included in the external device corresponds to a secret key used in public key cryptography.

16. The image input apparatus according to claim 13, wherein the image input apparatus includes a digital camera.

17. The image input apparatus according to claim 13, wherein the image input apparatus includes one of a scanner, a copying machine, and a facsimile.

18. The image input apparatus according to claim 13, wherein the interface means transmits the image data and the verification information to the external device.

19. A method comprising:
    receiving, from an image input apparatus, image data generated in the image input apparatus;
    converting the image data received from the image input apparatus into compressed image data;
    generating, using a secret key included in an external device and the compressed image data, verification information which is used to verify whether the image data is altered or not, wherein the external device is capable of connecting to the image input apparatus; and
    transmitting the verification information to the image input apparatus,
    wherein the image input apparatus includes an interface unit that transmits the image data to external device and receives the verification information from the external device, and a memory that stores the image data and the verification information.

20. The method according to claim 19, wherein the verification information corresponds to a digital signature.

21. The method according to claim 19, wherein the secret key included in the external device corresponds to a secret key used in public key cryptography.

22. The method according to claim 19, wherein the image input apparatus includes a digital camera.

23. The method according to claim 19, wherein the image input apparatus includes one of a scanner, a copying machine, and a facsimile.

24. The method according to claim 19, further comprising receiving the image data and the verification information from the image input apparatus after the verification information is transmitted from the external device to the image input apparatus.

25. An external device which is capable of connecting to an image input apparatus, the external device comprising:
- a receiving unit that receives, from the image input apparatus, image data generated in the image input apparatus;
- a converting unit that converts the image data received from the image input apparatus into compressed image data;
- a generating unit that generates, using a secret key included in the external device and the compressed image data, verification information which is used to verify whether the image data is altered or not; and
- a transmitting unit that transmits the verification information to the image input apparatus,
- wherein the image input apparatus includes an interface unit that transmits the image data to the external device and receives the verification information from the external device, and a memory that stores the image data and the verification information.

26. The external device according to claim 25, wherein the verification information corresponds to a digital signature.

27. The external device according to claim 25, wherein the secret key included in the external device corresponds to a secret key used in public key cryptography.

28. The external device according to claim 25, wherein the image input apparatus includes a digital camera.

29. The external device according to claim 25, wherein the image input apparatus includes one of a scanner, a copying machine, and a facsimile.

30. The external device according to claim 25, wherein the external device receives the image data and the verification information from the image input apparatus after the external device transmits the verification information to the image input apparatus.

* * * * *